United States Patent
Greer et al.

(10) Patent No.: US 12,327,499 B2
(45) Date of Patent: Jun. 10, 2025

(54) AUTOMATIC SCREEN SETTING ADJUSTMENT BASED ON BIOLOGICAL RESPONSES

(71) Applicant: GM Global Technology Operations LLC, Detroit, MI (US)

(72) Inventors: Aaron David Greer, St. Clair Shores, MI (US); Akilesh Rajavenkatanarayanan, Macomb, MI (US); Joseph F. Szczerba, Grand Blanc, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 249 days.

(21) Appl. No.: 18/303,836

(22) Filed: Apr. 20, 2023

(65) Prior Publication Data
US 2024/0355236 A1   Oct. 24, 2024

(51) Int. Cl.
| | |
|---|---|
| *G09G 3/00* | (2006.01) |
| *G06V 20/59* | (2022.01) |
| *G06V 40/18* | (2022.01) |
| *G06V 40/20* | (2022.01) |
| *B60K 35/00* | (2024.01) |
| *B60K 35/23* | (2024.01) |

(Continued)

(52) U.S. Cl.
CPC ............ *G09G 3/001* (2013.01); *G06V 20/59* (2022.01); *G06V 40/18* (2022.01); *G06V 40/20* (2022.01); *B60K 35/00* (2013.01); *B60K 35/23* (2024.01); *B60K 35/65* (2024.01); *B60K 35/81* (2024.01); *B60K 2360/21* (2024.01); *B60K 2360/349* (2024.01); *B60K 2360/741* (2024.01); *G09G 2320/0626* (2013.01); *G09G 2320/066* (2013.01); *G09G 2320/0666* (2013.01); *G09G 2320/08* (2013.01); *G09G 2354/00* (2013.01); *G09G 2380/10* (2013.01)

(58) Field of Classification Search
CPC ........... G09G 3/001; G09G 2320/0626; G09G 2320/066; G09G 2320/0666; G09G 2320/08; G06V 20/59; G06V 40/18; G06V 40/20
See application file for complete search history.

(56) References Cited

U.S. PATENT DOCUMENTS

| | | | |
|---|---|---|---|
| 10,824,239 B1 * | 11/2020 | Gupta | ............... G06F 3/017 |
| 2020/0114931 A1 * | 4/2020 | Rao | ................ B60W 40/09 |
| 2024/0071269 A1 * | 2/2024 | Hatakeyama | ......... G09G 3/002 |

OTHER PUBLICATIONS

Wang et al., Optical health analysis of visual comfort for bright screen display based on back propagation neural network, Computer Methods and Programs in Biomedicine, 2020, vol. 196, 105600, ISSN 0169-2607, https://doi.org/10.1016/j.cmpb.2020.105600. (https://www.sciencedirect.com/science/article/pii/S0169260720314334).

* cited by examiner

*Primary Examiner* — Grace Q Li
(74) *Attorney, Agent, or Firm* — Vivacqua Crane, PLLC

(57) ABSTRACT

A method for controlling the display of a vehicle includes receiving a video of a vehicle occupant inside the vehicle, detecting an action of the vehicle occupant of the vehicle using the video of the vehicle occupant inside the vehicle, and in response to detecting the action of the vehicle occupant, automatically adjusting a setting of the display of the vehicle based on the detected action of the vehicle occupant.

18 Claims, 5 Drawing Sheets

(51) Int. Cl.
*B60K 35/65* (2024.01)
*B60K 35/81* (2024.01)

AUTOMATIC SCREEN SETTING ADJUSTMENT BASED ON BIOLOGICAL RESPONSES

INTRODUCTION

The present disclosure relates to a system and method for automatic screen setting adjustment based on voluntary and involuntary biological responses.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicles include light sensors in various locations inside the vehicle to measure ambient light and then indirectly infer the vehicle user's needs for vehicle display brightness. This leads to inaccurate measurements, contrast, and colors to provide the best user experience.

SUMMARY

The present disclosure describes a method for controlling the display of a vehicle. The method includes receiving a video of a vehicle occupant inside the vehicle, detecting an action of the vehicle occupant of the vehicle using the video of the vehicle occupant inside the vehicle, and in response to detecting the action of the vehicle occupant, automatically adjusting a setting of the display of the vehicle based on the detected action of the vehicle occupant. Other embodiments of this aspect include corresponding computer systems, apparatus, and computer programs recorded on one or more computer storage devices, each configured to perform the actions of the methods.

Implementations may include one or more of the following features. The action is an involuntary biological response to an intensity of an ambient light inside the vehicle. The setting of the display includes at least one of a brightness, a color, or a contrast of the display of the vehicle. The involuntary biological response may be a change in size of a pupil of the vehicle occupant. The method may include detecting a decrease in the size of the pupil of the vehicle occupant; and in response to detecting the decrease in the size of the pupil of the vehicle occupant, adjusting the setting of the display of the vehicle includes increasing the brightness of the display of the vehicle. The method may include detecting an increase in the size of the pupil of the vehicle occupant; and in response to detecting the increase in the size of the pupil of the vehicle occupant, adjusting the setting of the display of the vehicle includes decreasing the brightness of the display of the vehicle.

The action may be a voluntary action. The voluntary action may include squinting, a hand gesture, putting on sunglasses, leaning towards the display, and/or lowering a sunshade of the vehicle. The method may include automatically adjusting the setting of the display of the vehicle based on the detected action of the vehicle occupant including using machine learning to determine an adjustment of the setting of the display based on the voluntary action. Implementations of the described techniques may include hardware, a method or process, or computer software on a computer-accessible medium.

The present disclosure also describes a tangible, non-transitory, machine-readable medium, comprising machine-readable instructions, that when executed by a processor, cause the processor to execute the method described above.

The present disclosure also describes a vehicle. The vehicle includes a camera configured to capture video of the vehicle occupant. The vehicle also includes a controller in communication with the camera. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
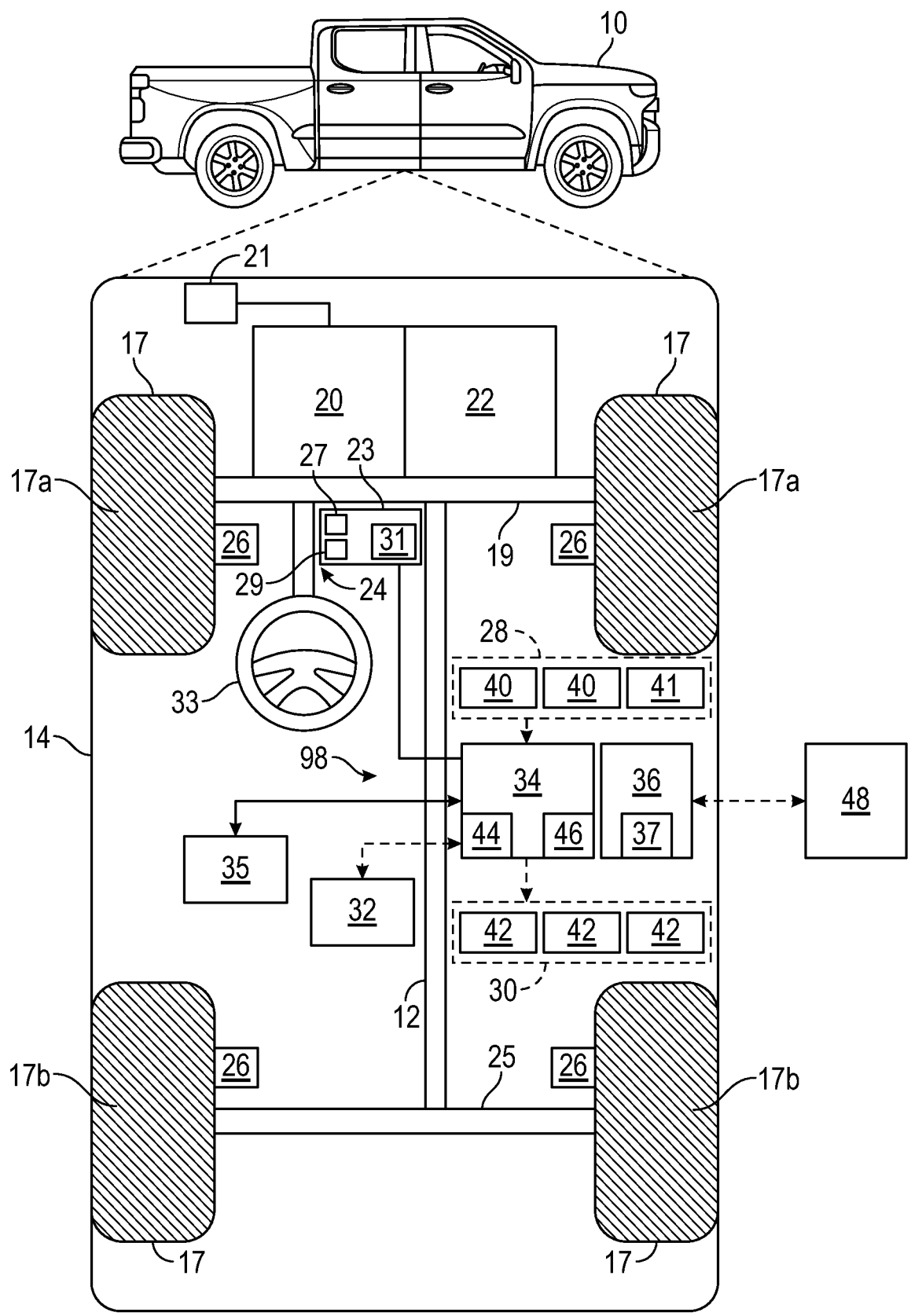
FIG. 1 is a block diagram depicting an embodiment of a vehicle including a system for controlling a display.

Reference will now be made in detail to several examples of the disclosure that are illustrated in accompanying drawings. Whenever possible, the same or similar reference numerals are used in the drawings and the description to refer to the same or like parts or steps.

Figure 2:
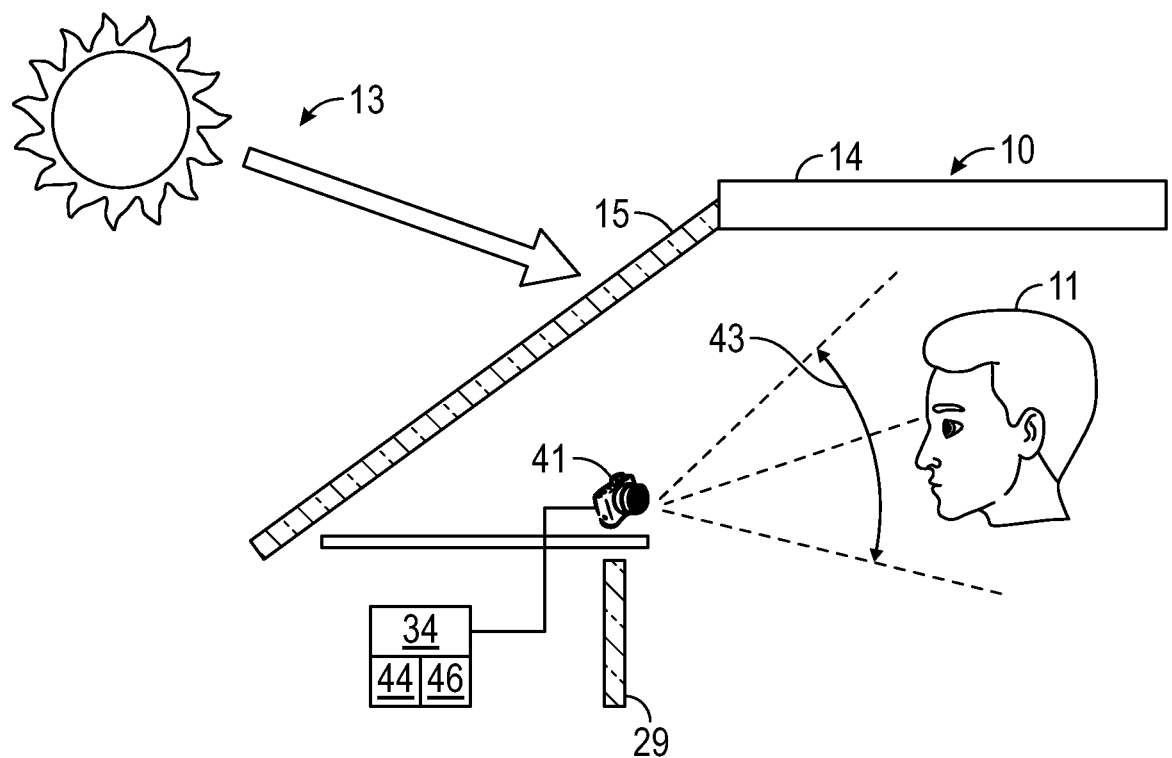
FIG. 2 is a schematic diagram of a system for controlling a display of the vehicle of FIG. 1.

With reference to FIGS. 1 and 2, a vehicle 10 generally includes a chassis 12, a body 14, a windshield 15 (FIG. 2) attached to the body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle, and a system 98 is incorporated into the vehicle 10. The system 98 may be referred to as the system or the system for controlling the display 29. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41 (e.g., eye tracker), one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources). The vehicle 10 and/or system 98 does not include light sensors capable of detecting light inside the vehicle 10.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute a method 100 (FIG. 3) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a vehicle occupant 11 (e.g., a vehicle driver or a vehicle passenger). For example, the user interface 23 may include a touch screen and/or buttons configured to receive inputs from a vehicle occupant 11. Accordingly, the controller 34 is configured to receive inputs from the user via the user interface 23. The vehicle 10 may include one or more displays 29 configured to display information to the vehicle occupant 11 (e.g., vehicle operator or passenger) and may be a head-up display (HUD).

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

With reference to FIG. 2, the camera 41 is part of a driver monitoring system capable of capturing video of the vehicle occupant 11. The camera 41 has a field of view 43 large enough to capture video of the vehicle occupant 11. As non-limiting examples, the camera 41 is located inside the vehicle 10 and is positioned to capture video of involuntary and voluntary actions of the vehicle occupant 11 in response ambient light 13 entering the vehicle 10, such as squinting eyes pupil dilation, hand gestures blocking light, wearing sunglasses, among others. Because of the camera 41 is specifically designed and positioned to capture video of involuntary and voluntary actions by the vehicle occupant 11 that are responsive to the presence or the absence of ambient light 13 inside the vehicle 10, the vehicle 10 does not include light sensor capable of detecting the presence of absence of visible light inside the vehicle 10. The camera 41 is in communication with the controller 34.

The system 98 uses the camera 41 to detect biological responses of the vehicle occupant 11, such as a change in the pupil diameter, and automatically adjusts the settings of the display 29, such a brightness, color and/or contrast, to maximize the usability and eye comfort of the vehicle occupant 11. The system 98 therefore negates the need for expensive and redundant light sensors mounted throughout the cabin of the vehicle 10. In fact, to determine the settings of the display 29, the vehicle occupant's biological response to light inside the vehicle 10 are more relevant than the light impacting the display 29. It is therefore desirable to include the system 98 in the vehicle 10 instead of relying on light sensors inside the vehicle cabin.

Figure 3:
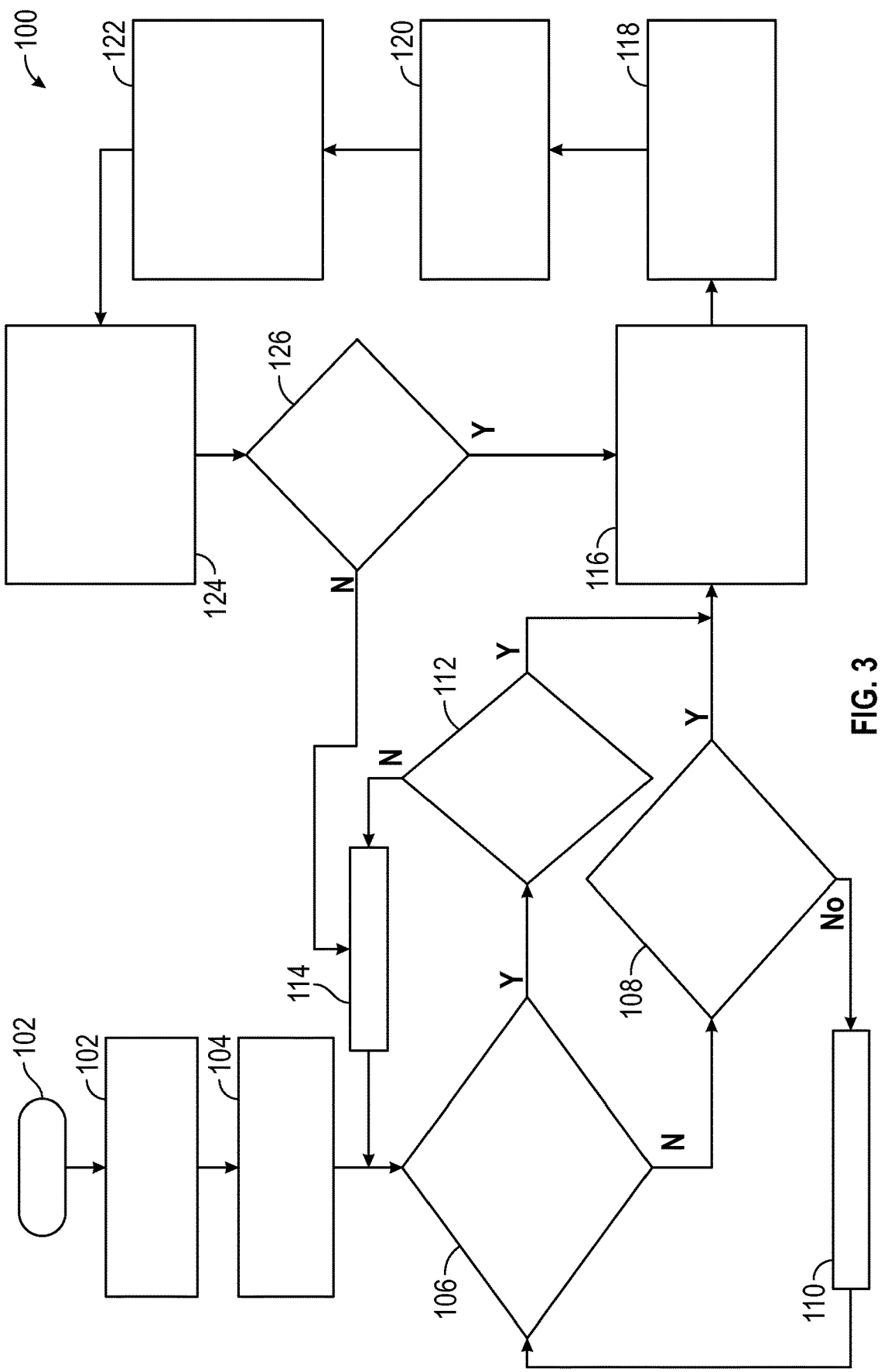
FIG. 3 is a flowchart of a method for controlling the display of the vehicle of FIG. 1.

FIG. 3 is a flowchart of a method 100 for controlling the display 29. The method 100 begins at block 102. Then, the method 100 continues to block 104. At block 104, the vehicle occupant (e.g., the vehicle driver or passenger) rides inside the passenger compartment of the vehicle 10. Then, the method 100 proceeds to block 104.

At block 104, the driver monitoring system (DMS) observes the vehicle occupant. Specifically, at block 104, the camera 41 captures video of the vehicle occupant 11 inside the vehicle 10. Then, the method 100 continues to block 106. At block 106, the controller 34 uses the video received from the camera 41 to detect an involuntary biological response to the ambient light 13 inside the vehicle 10. As non-limiting examples, the involuntary biological response may include a change in size (e.g., increase or decrease) of the pupil of the vehicle occupant 11. If no involuntary biological response by the vehicle occupant 11 is detected, then the method 100 proceeds to block 108.

At block 108, the controller 34 determines, using the video captured by the camera 41, whether a predefined voluntary action by the vehicle occupant 11 has been detected. The predefined voluntary actions include actions in response to ambient light 13 inside the vehicle 10, such as squinting, a hand gesture to block sunlight, putting on sunglasses, leaning towards the display, and/or lowering a sunshade of the vehicle 10. If no voluntary action is detected at block 108, the method 100 proceeds to block 110. At block 110, no action is performed by the system 98. Then, the method 100 returns to block 106.

If, at block 106, the controller 34 detects an involuntary biological response to the ambient light 13 inside the vehicle 10, then the method 100 continues to block 112. At block 112, the controller 34 determines that the whether the intensity of the involuntary biological response is greater than a predetermined threshold. For example, at block 112, the controller 34 may determine whether the pupil diameter of the vehicle occupant 11 decreased or increased more than a predetermined percentage threshold. If, at block 112, the controller 34 determines that the intensity of the involuntary biological response is not greater than a predetermined threshold, then the method 100 continues to block 114. At block 114, no action is performed by the system 98. Then, the method 100 returns to block 106. At block 112, the intensity of the involuntary biological response is greater than a predetermined threshold, then the method 100 proceeds to block 116. Also, at block 108, if the predefined voluntary action by the vehicle occupant 11 is detected, then the method 100 continues to block 116.

At block 116, the controller 34 determines the settings of the display 29 (e.g., brightness, color, and/or contrast) needed to maximize the eye comfort of the vehicle occupant 11 looking at the display 29. For example, in response to detecting the decrease in the size (e.g., diameter) of the pupil of the vehicle occupant 11 by more than the predetermined percentage threshold, the controller 34 determines that the amount that the brightness of the display 29 of the vehicle 10 should be increased to maximize the eye comfort of the vehicle occupant 11. As another example, in response to detecting the increase in the size (e.g., diameter) of the pupil of the vehicle occupant 11 by more than the predetermined percentage threshold, the controller 34 determines that the amount that the brightness of the display 29 of the vehicle 10 should be decreased to maximize the eye comfort of the vehicle occupant 11. Then, the method 100 continues to block 118.

At block 118, the controller 34 commands the display 29 to adjust its setting as determined in block 116. Then, the method 100 continues to block 120. At block 120, the controller 34 records the biological and voluntary responses for the specific vehicle occupant 11. Then, the method 100 proceeds to block 122. At block 122, the controller 34 compiles the date, time, and weather information along with navigation route, GPS data, and road database information. Then, the method 100 continues to block 124. At block 124, the controller 34 uses the compiled environmental/context information in block 122 with the historical user biological and voluntary responses to predict the response of the vehicle occupant 11 in the future. For example, the controller 34 may use machine learning at block 124 to predict the response by the vehicle occupant 11. Then, the method 100 continues to block 126. At block 126, the controller 34 determines whether the intensity of the predicted response by the vehicle occupant 11 is greater than a predetermined threshold value. If the intensity of the predicted response by the vehicle occupant 11 is greater than the predetermined threshold value, then the method 100 proceeds to block 116. If the intensity of the predicted response by the vehicle occupant 11 is not greater than the predetermined threshold value, then the method 100 proceeds to block 114.

Figure 4:
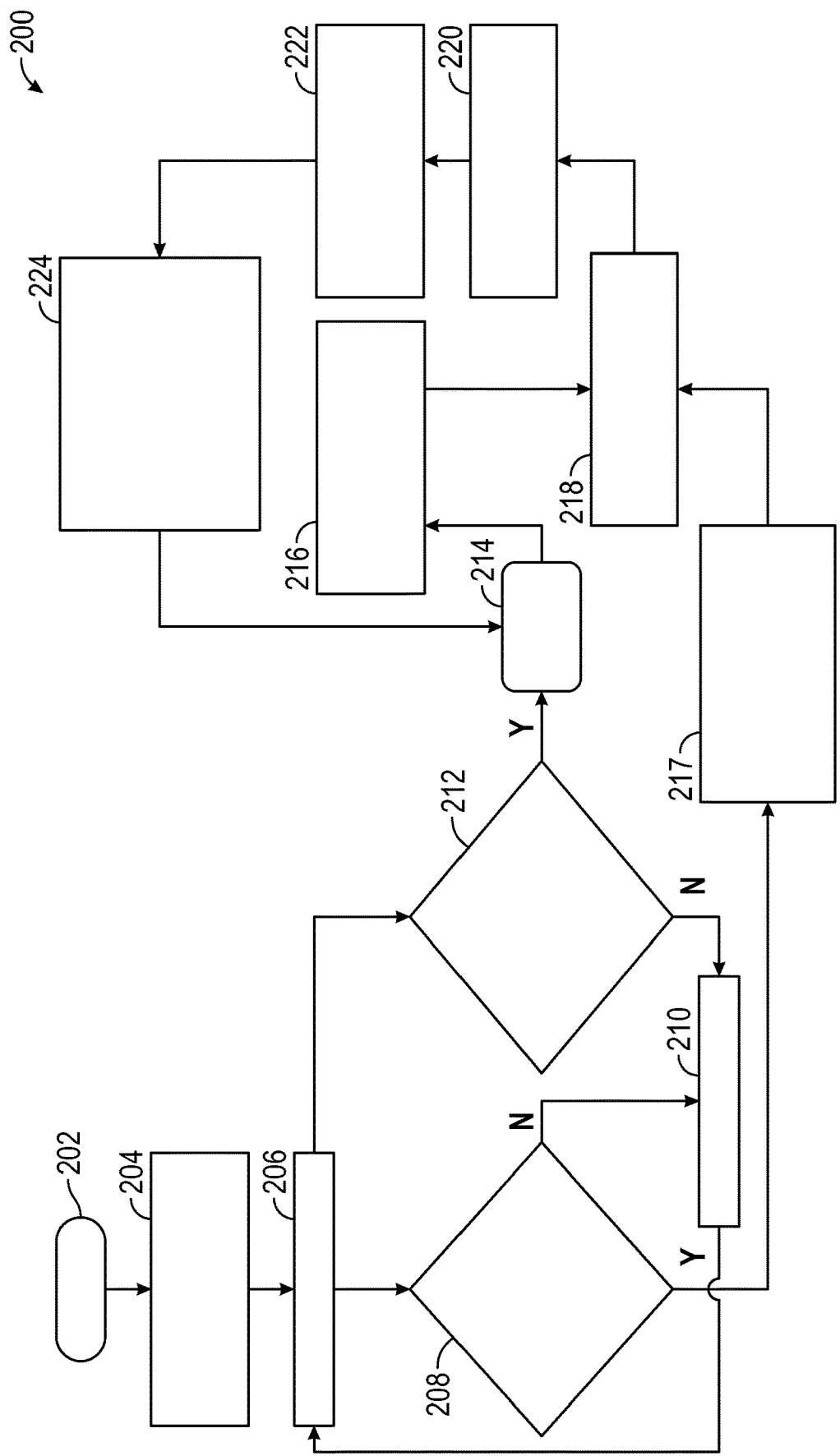
FIG. 4 is a flowchart of a method for controlling the display of the vehicle of FIG. 1 in accordance with another aspect of the present disclosure.

FIG. 4 is a flowchart of a method 200 for controlling the display 29. The method 200 begins at block 202. Then, the method 200 continues to block 204. At block 204, the vehicle occupant (e.g., the vehicle driver or passenger) rides inside the passenger compartment of the vehicle 10. Then, the method 100 proceeds to block 204.

At block 204, the driver monitoring system (DMS) observes the vehicle occupant. Specifically, at block 204, the camera 41 captures video of the vehicle occupant 11 inside the vehicle 10. Then, the method 200 continues to block 206. At block 206, the controller 34 uses the video received from the camera 41 to detect an involuntary biological response to the ambient light 13 inside the vehicle 10. As non-limiting examples, the involuntary biological response may include a change in size (e.g., increase or decrease) of the pupil of the vehicle occupant 11. If no involuntary biological response by the vehicle occupant 11 is detected, then the method 200 proceeds to block 208.

At block 208, the controller 34 determines, using the video captured by the camera 41, whether a predefined voluntary action by the vehicle occupant 11 has been detected. The predefined voluntary actions include actions in response in response to ambient light 13 inside the vehicle 10, such as squinting, a hand gesture to block sunlight, putting on sunglasses, leaning towards the display, and/or lowering a sunshade of the vehicle 10. If no voluntary action is detected at block 108, the method 200 proceeds to block 210. At block 210, no action is performed by the system 98. If a voluntary action is detected at block 108, the method 200 proceeds to block 217. Then, the method 200 returns to block 206. At block 217, the controller 34 determines the settings of the display 29 (e.g., brightness, contrast, and/or color) based on the detected predefined voluntary action to maximize the vehicle occupant's eye comfort.

After block 206, the method also continues to block 212. At block 212, the controller 34 determines whether an involuntary biological response (e.g., change in pupil size) to the ambient light 13 inside the vehicle 10 is detected. If no involuntary biological response is detected, the method 200 continues to block 210. At block 210, no action is performed by the system 98. If an involuntary biological response is detected, the method 200 continues to 214. At block 214, the controller 34 runs a machine-learning model based on the vehicle occupant's involuntary biological response. By using the users' involuntary biological response (e.g., changes in pupil size) and historical biological response in conjunction with contextual information such as date, time, weather, navigation route, GPS, and road database information, to increase or decrease in light as response to increase in ambient light, the machine-learning model predicts their visual comfort to adjust screen brightness and other display characteristics in the vehicle 10. Then, the method 200 continues to block 216.

At block 216, the controller 34 predicts the optimal display settings (e.g., brightness, contrast, and/or color) using the machine-learning model. Then, the method 200 continues to block 218. At block 218, the controller 34 computes an average between the display setting values determined at block 216 and the display setting values determined at block 218. Then, the method 200 continues to block 220. At block 220, the controller 34 commands the display to adjust its setting as determined in block 218. Then, the method 200 continues to block 222. At block 222, the controller 34 records the biological responses for the specific vehicle occupant 11. Then, the method 200 continues to block 224. At block 224, the controller 34 compiles the date, time, and weather information along with navigation route, GPS data, and road database information. Then, the method 200 continues to block 214. The compiled information at block 224 functions as an input to the machine-learning model at block 214.

Figure 5:
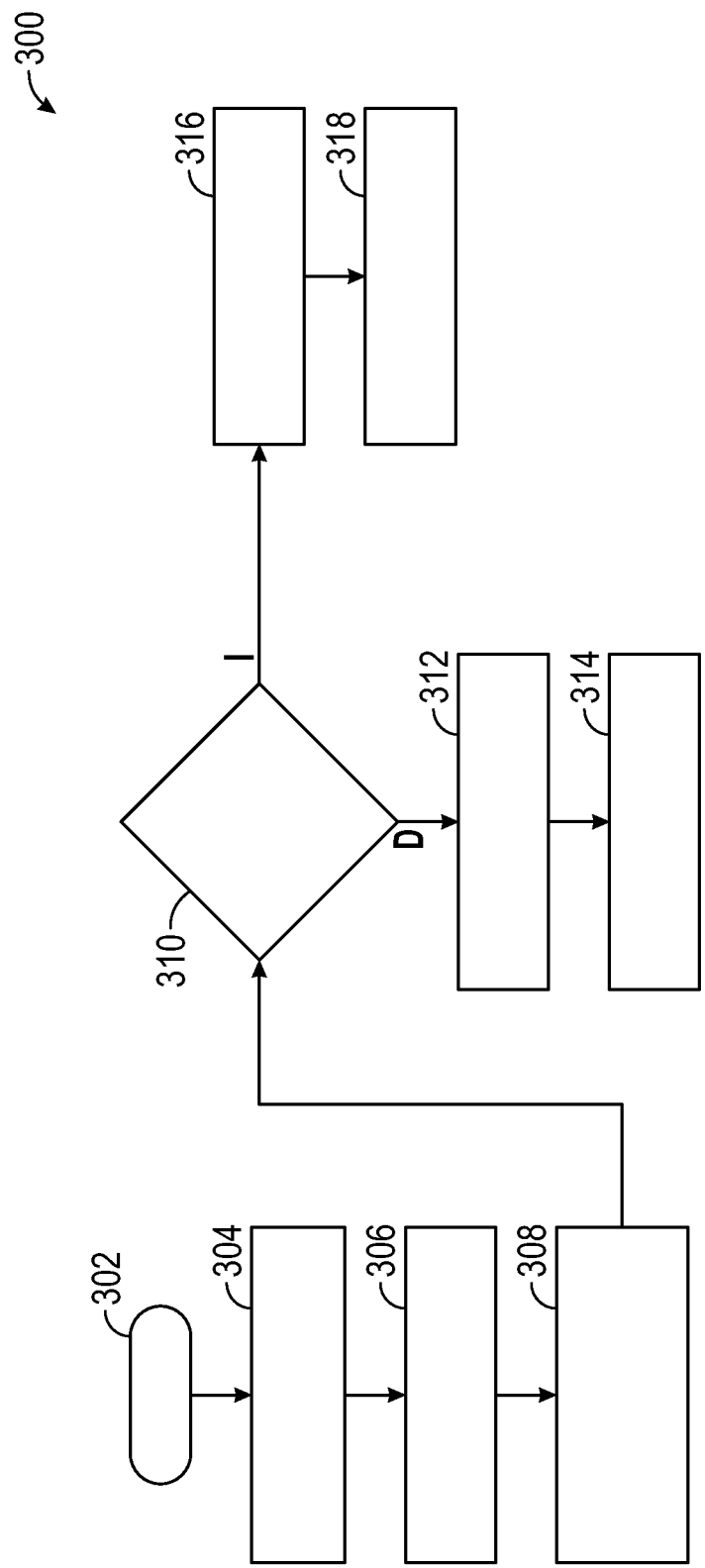
FIG. 5 is a flowchart of a method for controlling the display of the vehicle of FIG. 1 in accordance with yet another aspect of the present disclosure.

FIG. 5 is a flowchart of a method 300 for controlling the display 29, which may be a head-up display (HUD). The method 300 begins at block 302. Then, the method 300 continues to block 304. At block 304, the display 29 (e.g., HUD) starts with the default graphics intensity. Then, the method 300 continues to block 306. At block 306, the controller 34 uses the video received from the camera 41 to detect an involuntary biological response to the ambient light 13 inside the vehicle 10. As non-limiting examples, the involuntary biological response may include a change in size (e.g., increase or decrease) of the pupil of the vehicle occupant 11. Then, the method 300 continues to block 308. At block 308, the controller 34 commands the display 29 (e.g., HUD) to adjust its graphics intensity based on the detected change in pupil size (e.g., pupil diameter). Then, the method 300 continues to block 310.

At block 310, the controller 34 determines whether the pupil size (e.g., pupil diameter) of the vehicle occupant 11 has increased or decreased. If the pupil size has increased, then the method 300 proceeds to block 316. If the pupil size has decreased, then the method 300 continues to block 312.

At block 312, the controller 34 determines that the ambient light 13 is bright. Then, the method 300 continues to block 314. At block 314, the controller 34 scales up the luminance of the display (e.g., HUD) graphics.

At block 316, the controller 34 determines that the ambient light 13 is dull. Then, the controller 34 scales down the luminance of the display (e.g., HUD) graphics.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling a display setting of a display of a vehicle, the display setting including a brightness, a contrast, and a color, the method comprising:
   receiving a video of a vehicle occupant inside the vehicle;
   detecting an involuntary biological response and a voluntary response of the vehicle occupant of the vehicle using the video of the vehicle occupant inside the vehicle;
   recording the involuntary biological response and the voluntary response for the vehicle occupant;
   compiling a date, a time, weather information, a navigation route, GPS data, and road database information;
   inputting the recorded involuntary biological response and the voluntary response for the vehicle occupant and the associated compiled date, time, weather information, the navigation route, the GPS data, and the road database information into a machine learning model;
   determining a predefined display setting when the voluntary response is determined to be a predefined voluntary response;
   executing the machine learning model to predict an optimal display setting when the involuntary biological response is detected;
   computing an average display setting between the predefined display setting and the optimal display setting; and
   commanding the display to adjust the display setting to be the average display setting.

2. The method of claim 1, wherein the involuntary biological response is to an intensity of an ambient light inside the vehicle, and the display is a head-up display.

3. The method of claim 2, wherein the involuntary biological response is a change in size of a pupil of the vehicle occupant.

4. The method of claim 3, wherein:
detecting the action of the vehicle occupant based on the video of the vehicle occupant inside the vehicle includes detecting a decrease in the size of the pupil of the vehicle occupant; and
in response to detecting the decrease in the size of the pupil of the vehicle occupant, adjusting the setting of the display of the vehicle includes increasing the brightness of the display of the vehicle.

5. The method of claim 3, wherein:
detecting the action of the vehicle occupant based on the video of the vehicle occupant inside the vehicle includes detecting an increase in the size of the pupil of the vehicle occupant; and
in response to detecting the increase in the size of the pupil of the vehicle occupant, adjusting the setting of the display of the vehicle includes decreasing the brightness of the display of the vehicle.

6. The method of claim 1, wherein the voluntary action includes at least one of squinting, a hand gesture, putting on sunglasses, leaning towards the display, or lowering a sunshade of the vehicle.

7. A tangible, non-transitory, machine-readable medium, comprising machine-readable instructions, that when executed by a processor, cause the processor to:
receive a video of a vehicle occupant inside a vehicle;
detect an involuntary biological response and a voluntary response of the vehicle occupant of the vehicle using the video of the vehicle occupant inside the vehicle;
record the involuntary biological response and the voluntary response for the vehicle occupant;
compile a date, a time, weather information, a navigation route, GPS data, and road database information;
input the recorded involuntary biological response and the voluntary response for the vehicle occupant and the associated compiled date, time, weather information, the navigation route, the GPS data, and the road database information into a machine learning model;
determine a predefined display setting when the voluntary response is determined to be a predefined voluntary response;
execute the machine learning model to predict an optimal display setting when the involuntary biological response is detected;
compute an average display setting between the predefined display setting and the optimal display setting; and
command a display in communication with the processor to adjust a display setting to be the average display setting.

8. The tangible, non-transitory, machine-readable medium of claim 7, wherein the involuntary biological response is to an intensity of an ambient light inside the vehicle.

9. The tangible, non-transitory, machine-readable medium of claim 8, wherein the involuntary biological response is a change in size of a pupil of the vehicle occupant.

10. The tangible, non-transitory, machine-readable medium of claim 9, wherein the tangible, non-transitory, machine-readable medium, further comprising machine-readable instructions, that when executed by the processor, causes the processor to:
detect a decrease in the size of the pupil of the vehicle occupant; and
in response to detecting the decrease in the size of the pupil of the vehicle occupant, command the display of the vehicle to increase the brightness.

11. The tangible, non-transitory, machine-readable medium of claim 10, wherein the tangible, non-transitory, machine-readable medium, further comprising machine-readable instructions, that when executed by the processor, causes the processor to:
detect an increase in the size of the pupil of the vehicle occupant; and
in response to detecting the increase in the size of the pupil of the vehicle occupant, command the display of the vehicle to decrease the brightness.

12. The tangible, non-transitory, machine-readable medium of claim 7, wherein the voluntary action includes at least one of squinting, a hand gesture, putting on sunglasses, leaning towards the display, or lowering a sunshade of the vehicle, and the setting of the display includes a brightness, a color, and a contrast of the display of the vehicle.

13. A system in a vehicle, comprising:
a display having a display setting, wherein the display setting includes a brightness, a contrast, and a color;
a camera configured to capture video of a vehicle occupant;
a controller in communication with the camera and the display, wherein the controller is programmed to:
receive a video of a vehicle occupant inside a vehicle;
detect an involuntary biological response and a voluntary response of the vehicle occupant of the vehicle using the video of the vehicle occupant inside the vehicle;
record the involuntary biological response and the voluntary response for the vehicle occupant;
compile a date, a time, weather information, a navigation route, GPS data, and road database information;
input the recorded involuntary biological response and the voluntary response for the vehicle occupant and the associated compiled date, time, weather information, the navigation route, the GPS data, and the road database information into a machine learning model;
determine a predefined display setting when the voluntary response is determined to be a predefined voluntary response;
execute the machine learning model to predict an optimal display setting when the involuntary biological response is detected;
compute an average display setting between the predefined display setting and the optimal display setting; and
command the display to adjust the display setting to be the average display setting.

14. The system of claim 13, wherein the involuntary biological response is to an intensity of an ambient light inside the vehicle.

15. The system of claim 14, wherein the involuntary biological response is a change in size of a pupil of the vehicle occupant.

16. The system of claim 15, wherein the controller is programmed to:
detect a decrease in the size of the pupil of the vehicle occupant; and
in response to detecting the decrease in the size of the pupil of the vehicle occupant, command the display of the vehicle to increase the brightness.

17. The system of claim 15, wherein the controller is programmed to:

detect an increase in the size of the pupil of the vehicle occupant; and in response to detecting the increase in the size of the pupil of the vehicle occupant, command the display of the vehicle to decrease the brightness.

18. The system of claim 13, wherein the voluntary action includes at least one of squinting, a hand gesture, putting on sunglasses, leaning towards the display, or lowering a sunshade of the vehicle.

* * * * *